July 14, 1931.  O. W. COWGILL  1,814,369
PAPER BOX MAKING MACHINE
Filed July 21, 1927   7 Sheets-Sheet 1

Inventor:
ORPH W. COWGILL
By John H. Bruninga
His Atty.

July 14, 1931.  O. W. COWGILL  1,814,369
PAPER BOX MAKING MACHINE
Filed July 21, 1927   7 Sheets-Sheet 2
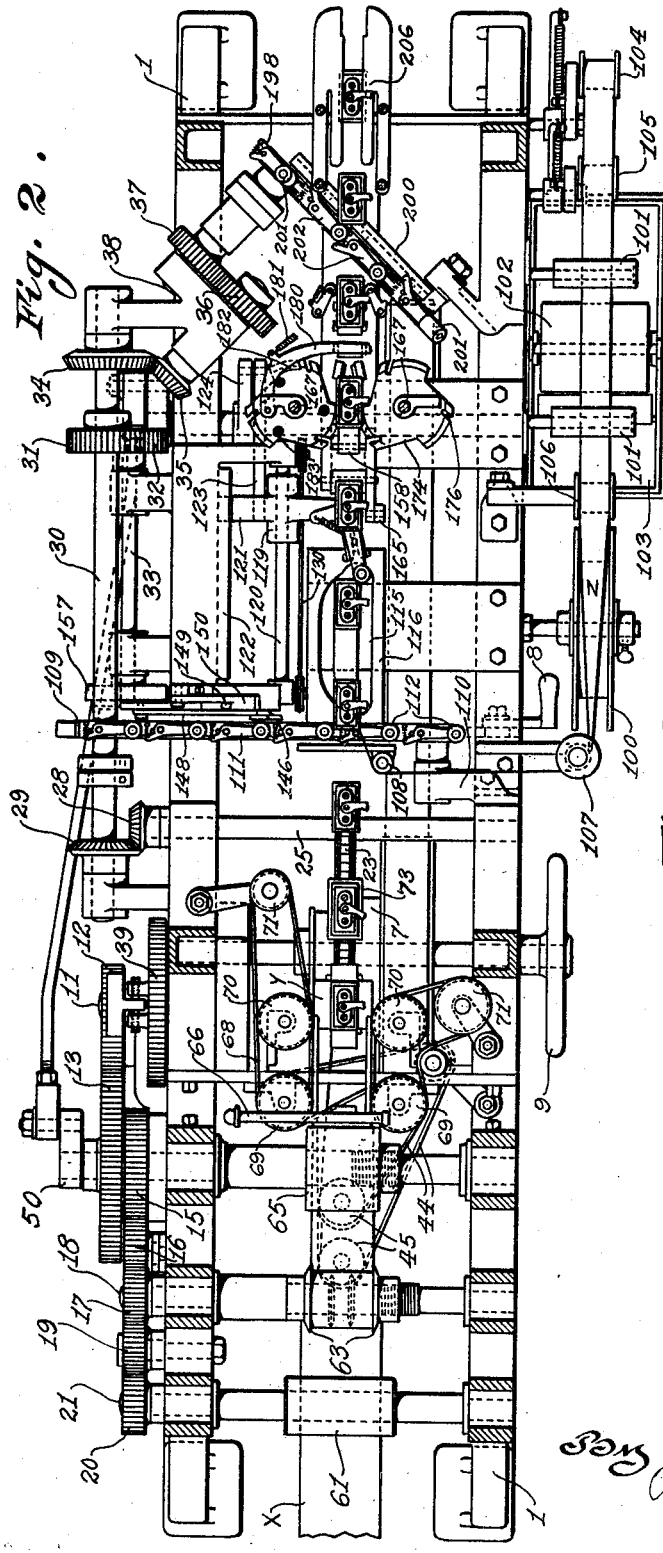
Inventor.
ORPH W. COWGILL
By John H. Bunnega
His Attorney.

July 14, 1931.  O. W. COWGILL  1,814,369
PAPER BOX MAKING MACHINE
Filed July 21, 1927  7 Sheets-Sheet 3

Inventor:
ORPH W. COWGILL,
John N. Bruninga
His Attorney.

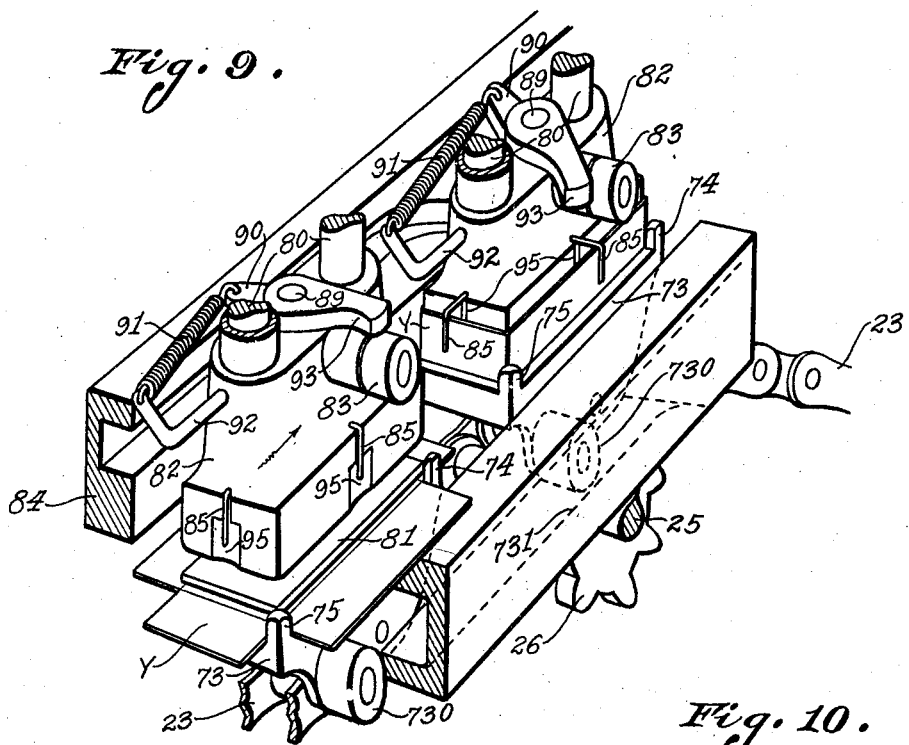

July 14, 1931.  O. W. COWGILL  1,814,369
PAPER BOX MAKING MACHINE
Filed July 21, 1927   7 Sheets-Sheet 5

Inventor:
ORPH W. COWGILL,
By John N. Bruninga
His Attorney.

July 14, 1931.  O. W. COWGILL  1,814,369
PAPER BOX MAKING MACHINE
Filed July 21, 1927   7 Sheets-Sheet 6

Inventor:
ORPH W. COWGILL,
By John H. Bruninga
His Attorney.

July 14, 1931. O. W. COWGILL 1,814,369
PAPER BOX MAKING MACHINE
Filed July 21, 1927 7 Sheets-Sheet 7
Fig. 17.
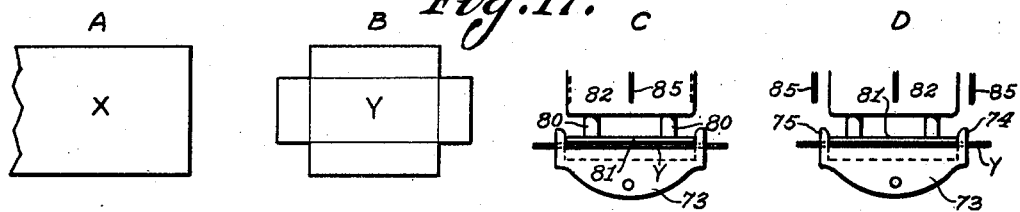
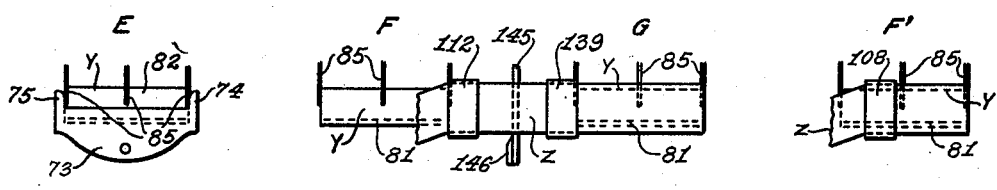
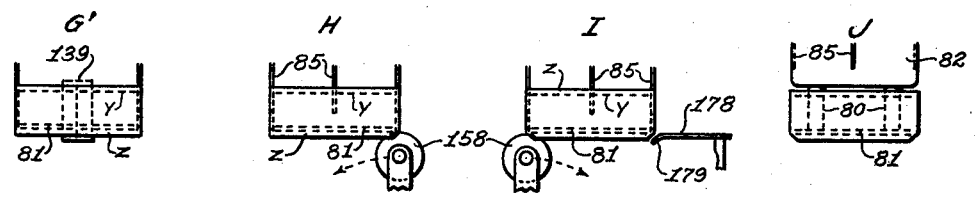
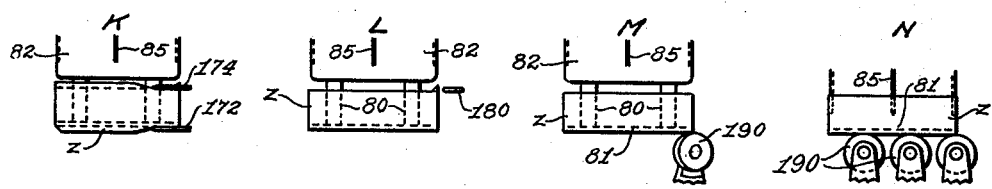
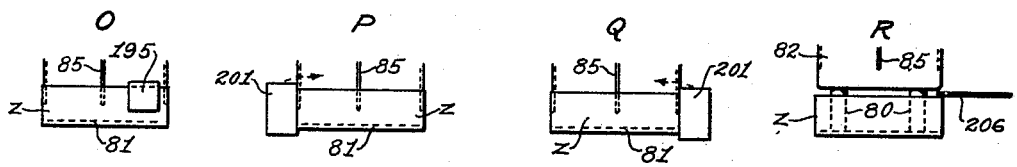
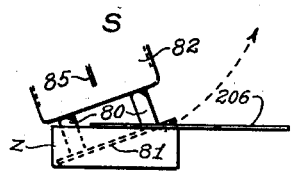
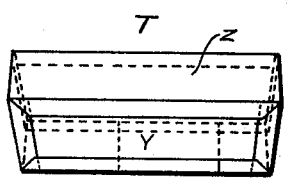
Inventor:
ORPH W. COWGILL,
John N. Bruninga
His Attorney.

Patented July 14, 1931

1,814,369

UNITED STATES PATENT OFFICE

ORPH W. COWGILL, OF UNIVERSITY CITY, MISSOURI, ASSIGNOR TO ST. LOUIS LABEL WORKS, OF ST. LOUIS, MISSOURI, A CORPORATION OF MISSOURI

PAPER BOX MAKING MACHINE

Application filed July 21, 1927. Serial No. 207,450.

This invention relates to box making machines and more particularly to machines of the character in which a formed box blank has a band wrapped therearound so as to hold the blank together and provide a finish. The invention is particularly applicable to the manufacture of small boxes; it will be understood, however, that many features of this invention are applicable to machines for making other kinds of boxes and like devices.

One of the objects of this invention is to provide a machine of the character described whereby boxes can be produced in large quantities and in an economical and efficient manner.

Another object is to provide improved mechanism for feeding the box blanks, more particularly from the cutting and scoring mechanism to the forming mechanism, in a simple and efficient manner.

Another object is to provide improved mechanism for forming the blank to shape.

Another object is to provide improved mechanism for wrapping a band around a formed blank in a continuous and effective manner.

Another object is to provide improved mechanism for folding and turning in the upper and lower projecting edges of the band.

Another object is to provide a machine of the character described in which the operations will be continuous, so that the blank will not only be formed and wrapped to produce the finished article, but so that the movement of the formed blank through the machine will be continuous.

Further objects are to improve the machine in details and to produce one which is simple in construction, effective in its action and economical in its operation. Further objects will appear from the following description taken in connection with the accompanying drawings, in which:

Figure 2 is a section on the line 2—2 Fig. 2, showing parts in plan;

Figure 3 is a detail showing the cam for operating the heads;

Figure 4 is a detail section on the line 4—4 Fig. 3, showing the retainer release cam;

Figure 9 is a perspective view showing the mechanisms in successive positions in the formation of the blank;

Figure 10 is a perspective view showing mechanisms in successive positions for applying the wrapper band around the formed blank;

Figure 17 is a flow sheet showing the various operations.

Figure 1:
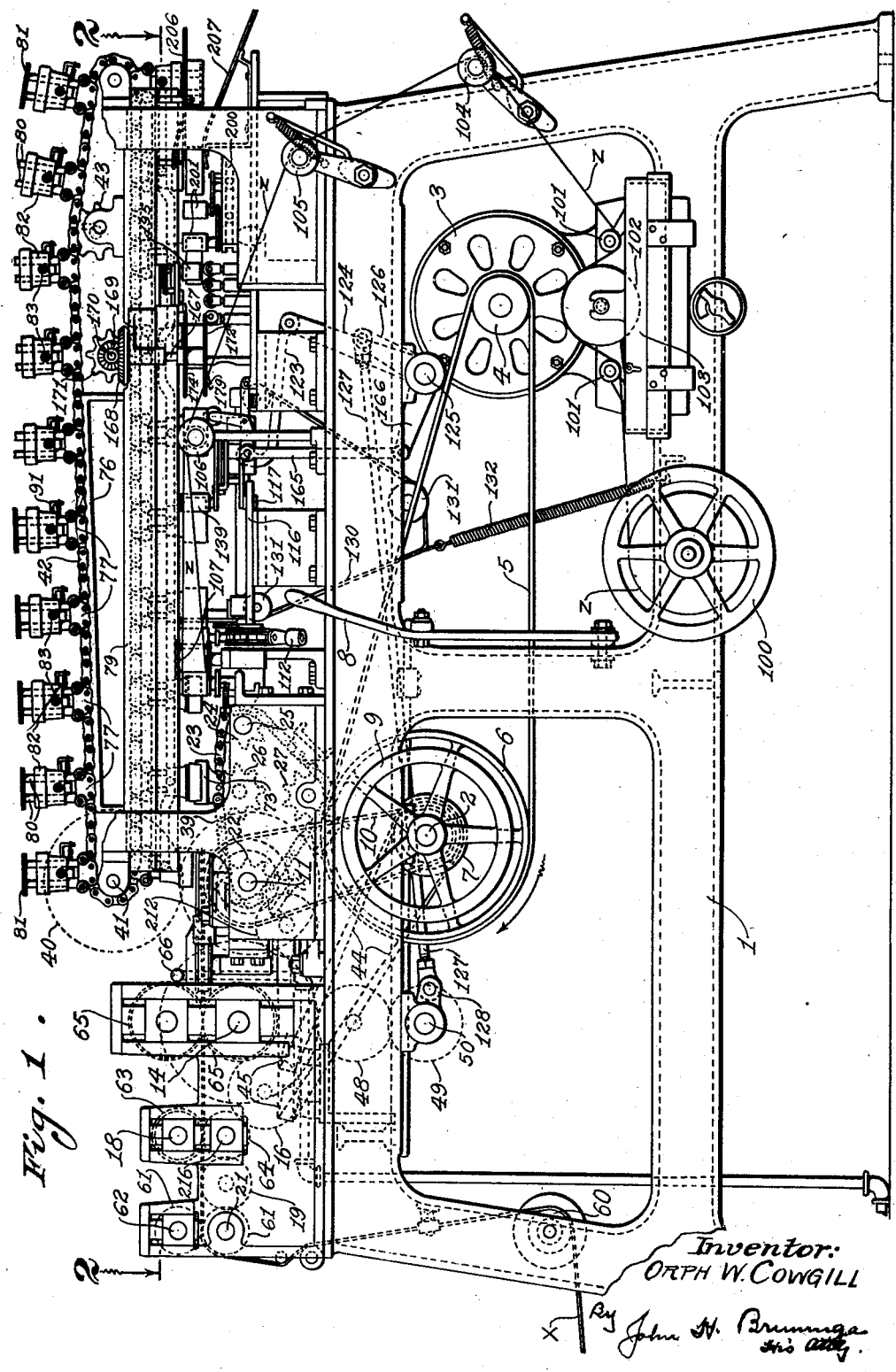
Figure 1 is a side elevation of a machine embodying this invention.

Generally stated in accordance with the illustrated embodiment of this invention, a blank is cut from a strip of cardboard and scored; this blank is fed to forming mechanism where the blank is shaped; a band is then wrapped around the formed blank, the edges thereof turned and wiped in, and the entire wrapper pressed and smoothed against the box body.

One of the features of this invention resides in a blank feeding mechanism whereby the blank is advanced by means engaging the blank edge. In accordance with one embodiment of this invention the blank after being cut or died, and scored, enters a guide arranged so that the side edges of the blank are accessible; arranged on each side of the guide is a belt extending along the guide and along the path of movement of the blank. This belt feed moves at a greater speed than that at which it is delivered by the cutting mechanism.

Another feature of this invention resides in mechanism whereby the blank is projected into the forming mechanism for shaping the blank. In accordance with one embodiment of this invention the forming mechanism comprises a mold or carrier which is movable into blank receiving position with respect to the blank guide, and the feeding mechanism, which is preferably of the character heretofore referred to, operates to project the blank into position on the mold while the former cooperates therewith to shape the blank.

Another feature of this invention resides in a former provided with a series of blank retainers arranged to hold the shaped blank on the former while the band is wrapped around the shaped blank; this former operates after the band has been wrapped thereon to press the projecting edges of the band against the inside faces of the box.

In accordance with one embodiment of this invention the former has a plunger the faces of which are recessed so that the retainers operate to press the upstanding parts of the blank into the recessed faces; the recesses, however, do not extend upwardly the full depth of the box so that when the blank operates to wipe the upstanding edges of the band against the inside faces of the box, the wiping will be along the entire inside upper box edge.

Another feature of this invention resides in an improved process and mechanism for wrapping the band around the box so as to secure a continuous operation, the band being attached onto a box of a series, the band wrapped therearound and the lagging part of the band being attached to the next box to be wrapped before the band is cut between the boxes. In accordance with one embodiment of this invention a band applying element operates to press the band (which has been rendered adhesive by the application of paste) against the leading or forward end of the shaped blank or box; the box is then moved on while the band is drawn along therewith; a band applying element then travels in a circuit around the box so as to apply the band thereto; before the wrapping is complete another band applying element will operate to apply or attach the lagging part of the band to the leading end of the next box to be wrapped; a cutter now operates to cut the band between the elements and the cut end of the band is applied to the box to complete the wrapping while the same cycle of operations begins on the next succeeding box.

Another feature of this invention resides in improved process and mechanism for wiping inwardly the projecting edges of the band, the projecting edges of the band at the end of the box being wiped inwardly before the projecting edges of the band at the side of the box are wiped inwardly. In accordance with one embodiment of this invention, a wiping element positioned between two of the traveling boxes of the series operates to wipe in against the bottom successively the band edges at the lagging end of the one box and at the leading end of the adjacent box; suitable means such as disks, are provided to wipe against the bottom the projecting edges of the band along the sides. At the top, interrupted disks are provided which turn in the sides of the upstanding band edges and fingers on these disks operate to turn in the band edges at one end while another finger wipes in the banded edge at the other end. The plunger then operates as heretofore described to wipe the interrupted band edges against the inside faces of the box.

Further features will appear from the detail description taken in connection with the accompanying drawings, in which will be described an illustrative embodiment of this invention.

Referring to the accompanying drawings, and more particularly to Figures 1 and 2, the machine generally stated, comprises a frame 1 of any suitable construction adapted to support the various mechanisms. A main drive shaft 2 is supported in suitable bearings on this frame and may be driven from any suitable source of power, such as a motor 3 mounted on the frame and having a pulley 4 connected by a belt 5 to a pulley 6 on the shaft 2. A suitable clutch generally indicated at 7 may be provided to couple the pulley with the shaft and a shifting lever 8 is connected to shift this clutch. The shaft 2 may also be provided with a hand wheel 9 whereby it may be manually turned to position the parts. A chain or belt 10 connects a pulley or sprocket on shaft 2 with a pulley or sprocket on the shaft 11. The shaft 11 has a pinion 12 meshing with an idler 212, in turn meshing with a gear 13 on a shaft 14, which in turn has a gear 15 meshing through an idler 16 with a gear on a shaft 216, which has a gear meshing with a gear 17 on a shaft 18; the gear on shaft 216 meshes through an idler 19 with a gear on a shaft 21 which has a gear 20 meshing with a gear on a shaft 62. The shaft 11 has a sprocket 22 connected by a chain 23 with a sprocket 24 on a shaft 25 and idler sprockets 26 and 27 are provided for the chain 23. The shaft 25 has a bevel gear 28 meshing with a bevel gear 29 on a shaft 30 which has a gear 31 meshing with a gear 32 on a shaft 33. The shaft 30 also has a gear 34 meshing with a gear 35 on a shaft having a gear 36 meshing with a gear 37 on a shaft 38. The shaft 11 also has a gear 39 meshing with a gear 40 on a shaft 41 which has a sprocket wheel over which passes a chain 42 extending along the machine over a similar sprocket wheel on the further (right) end, Fig. 1, and over another supporting sprocket 43.

A belt 44 passes over a pulley on the shaft 2 thence over idlers 45 and around pulleys 46 (see Fig. 8) on shafts 47. The gear 13 also meshes with an idler 48 which in turn meshes with a gear 49 on a shaft 50.

Figure 8:
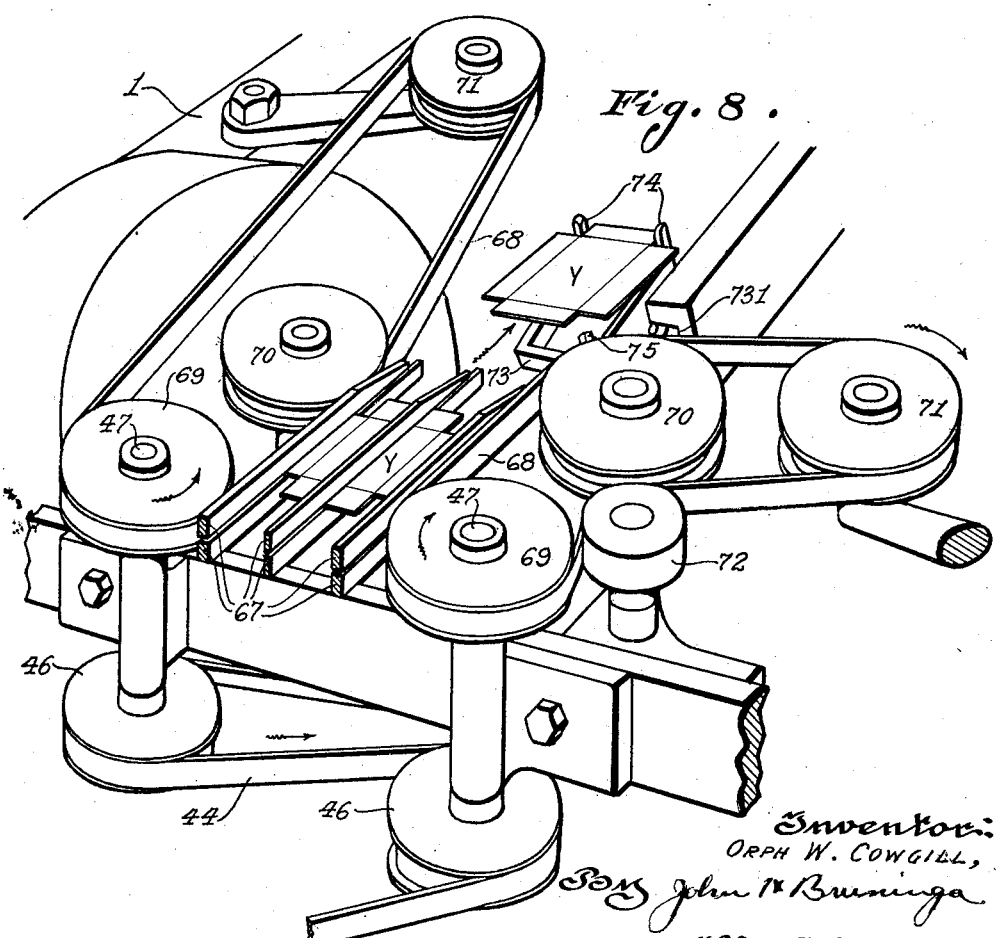
Fig. 8 is a perspective view showing the mechanisms for feeding the blanks.

Referring now to Figs. 1, 2 and 8, the strip X of material, from which the box blank is to be formed, passes over a guide 60 through feed rolls 61, the upper of which is on a shaft 62 and the lower of which is on a shaft inter-geared with 61. The strip next passes between cutters 63 on the shaft 18 cooperating with the ends of a roll 64 on a shaft having a gear intermeshing with the gear 17. The strip next passes through cooperating dies 65, one of which is on the shaft 14 and the other is fixed to a similar shaft having a gear meshing with 15. These dies 65 are arranged to form the blank Y, as shown in Fig. 8, and to also score the same. A pipe 66 directs a blast of air on the blank to discard the corners cut therefrom.

Referring now particularly to Figs. 1, 2 and 8, the blank Y is guided by rails 67 and is fed by belts 68, (which may be of leather or any other suitable material), engaging the edges of the blank which projects slightly beyond the outside rails. The belts 68 are driven by pulleys 69 fixed to the shafts 47 and these belts pass over idlers 70, 71 and 72, as shown particularly in Fig. 8. It will be noted that the idlers 70 guide the belts for the distance along the rails so that the belt portions between 69 and 70 are parallel; beyond the idlers 70, however, the belt portions diverge as shown.

Mounted on the chain 23 are a series of carriers or molds 73 mounted on a link of the chain so as to flex with the belt but retained against pivotal movement on the link to which the carrier is attached. In order to guide the carrier, it has a roll 730 moving on a track 731 (Fig. 9). Each of these carriers is hollow, as shown in Fig. 8, and is provided with upstanding lugs 74 at its forward end and with a single lug 75 at its rear end; the ends of these lugs are beveled as shown. The belts 68 are driven at a speed in excess of the travel of the strip X, through the various mechanisms including the dies 65. Accordingly as the blank Y is discharged from the dies it will be grasped edgewise by these belts and shot forwardly to engage the lugs 74 on the carrier 73, which is at that time in position to receive it. This provides simple and convenient mechanism for securing the operation just described.

Figure 5:
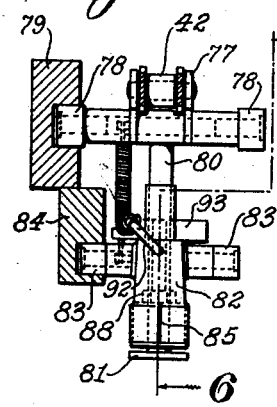
Figure 5 is a front elevation of one of the forming heads, the cam tracks being shown in section.
Figure 6:
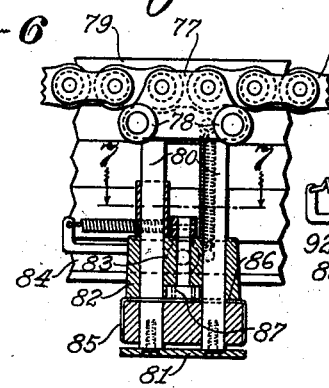
Figure 6 is a section on the line 6—6, Fig. 5.
Figure 7:
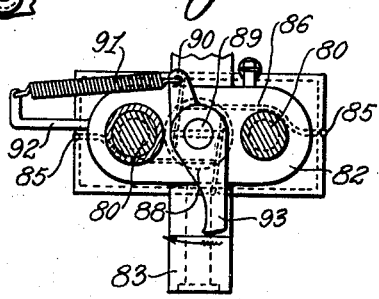
Figure 7 is a section on the line 7—7, Fig. 6.

Referring now particularly to Figs. 5, 6 and 7, in connection with Figs. 1 to 4 inclusive; mounted at intervals on links on the chain 42 which is guided by the sprocket 43 and also by a guideway 76, Fig. 1, are heads 77 having rolls 78 engaging guideways in plates 79 extending along the frame; only one such plate is shown in Figure 5, but it will be understood that there is one on each side. Since these heads are similar in construction a description of one will be sufficient. Each head has projecting therefrom shanks 80 connected at their lower ends by a plate 81. Sliding on these shanks is a plunger 82 also provided with rolls 83 engaging cam plates 84 also extending along the machine, it being also understood that there is a cam plate in each side, one for each roll 83. The grooves in the plates 79 and 84 are formed as shown in Fig. 3; it will be noted that the grooves in plates 79 operate to guide the heads and hold them vertically against tipping while the grooves in the plates 84 reciprocate the plungers 82 on the shanks 80. The lower end of the plunger is shaped to provide a form corresponding to and over which the box is shaped and later banded.

Each plunger 82 has on each of the four faces thereof, a groove to receive a holding finger 85 on a shank 86 having an upturned end 87 taking into a vertical socket on a disk 88, mounted in the plunger 82 and having a shaft 89 provided at its upper end with an arm 90 connected by a spring 91 with an arm 92 also on the head. This spring normally serves to retain the parts in such position as to hold the fingers 85 within the grooves and flush with the outer faces of the plunger. The shaft 89 also has fixed thereto a finger 93 arranged to engage a cam 94, Fig. 4, on one of the plates 84, in order to project the fingers against the tension of the springs 91; after the finger 93, however, passes the cam 94 the spring 91 again operates to move the fingers back into their grooves. On reference to Fig. 9, it will be seen that the finger receiving groove is enlarged, as shown at 95, in order to permit the blank material to be pressed therein; this enlargement, however, has a height which is less than the depth of the box for a purpose hereinafter to be described.

Upon reference to Fig. 9, in connection with Figs. 1 to 8 inclusive, it will be seen that after the blank has been positioned against the lug 74, as shown in Fig. 8, (at which time the lug 75 is below the plane of the rails 67) the carrier 73 is moved to a level position. Since the chain 23 is inter-geared with the chain 42, the carrier 73 and the cooperating head 77 and finger 85 can be also timed as to move into alinement. Now the cavity in the carrier is arranged to receive the plate 81 as well as the plunger 82. Accordingly, after the parts reach the position as shown in Fig. 9, at which time the plunger is retracted, the plate 81 will be in alinement with the carrier and the blank thereon. As, however, the parts travel from the first to the second position, Fig. 9, the carrier 73 will move upwardly on account of the elevated position of the sprocket 26 so as to cause the carrier to press and fold the blank over the former plunger thereabove; concurrently the cam 94 will operate to move the fingers 85 out of the way in order that the blank may pass underneath those fingers, these fingers being shown extended in the second position, Fig. 9. As the carrier moves along the fingers 85 are released so that their spring 91 operates to clamp the sides of the blank against the plunger, the tension being sufficient to carry the material into the groove enlargements 95, the upper limits of which are at this time above the upper edge of the side or end as shown in Fig. 10, so that the fingers are now really flush with the outside faces of the plunger.

The wrapper is now arranged to be applied. Referring to Fig. 1, this wrapper comprises, a band Z, sufficiently wider than the depth of the box, to permit it to be folded under the bottom thereof as well as around the upper edges thereof. This band is supported on any suitable reel 100, and passes under guide rolls 101 over a paste roll 102, dipping into a paste receiver 103, over tension rolls 104 and 105, and over another guide roll 106; from the latter the band Z passes over a roll 107 arranged vertically and hence to a roll 108. From this roll the band passes to the mechanism for applying the same to the box blank as folded over the plunger.

Referring now to Figs. 10 to 13 inclusive, in connection with Figs. 1 and 2, the shaft 30 has mounted thereon a sprocket over which passes a chain 109 which extends crosswise of the machine, passing at its other end over a sprocket on a bracket 110. This chain 109 has pivoted thereon arms 111 each of which is provided at its free end with a roll 112, arranged to engage the strip and normally held by a spring 113 against a stop 114. Arranged to travel in a cam groove 115 in a plate 116 is a roll 117 (see Figs. 11 and 12) on the end of an arm 118 pivoted on a crosshead 119 mounted to slide on a guide 120 and having a rearwardly projecting part 121 cooperating with a guide 122, Fig. 2. This crosshead is connected by a link 123 with an arm 124 on a rock-shaft 125, having an arm 126 connected by a link 127 with a crank 128 on the shaft 50; the cross-head 119 will be reciprocated so as to carry the roll 117 along the groove 115. In order to cause the roll 117 to travel in a circuit, the arm 118 is in the form of a bell crank lever, the other arm 129 of which is connected with a band 130 passing over idlers 131 and connected with a spring 132 anchored on the frame. From a comparison of Figs. 1 and 12 it will be seen that when the cross-head travels to the right from the position of Fig. 12 the tension of the band 130 changes about the middle of the groove and thereafter the cam roll 117 will be held to the outside face of the cam groove so as to insure its return travel in the other branch thereof; after the other branch is reached, however, and the roll 117 has passed the middle thereof, the tension of the band 130 again changes and the cam roll will then bear again against the inside of the cam groove so as to cause it again to enter the first branch.

The arm 118 has an upstanding pin 133 which engages between two arms 134 loosely pivoted about the pivot of the arm 118 and connected by a spring 135. Bearing between these arms is also a pin 136 projecting from an arm 137, also loose on the axis of the arm 118 and having pivoted thereto at its free end an arm 138 provided with a roll 139 and held by a spring 140 against a stop 141.

Figure 13:
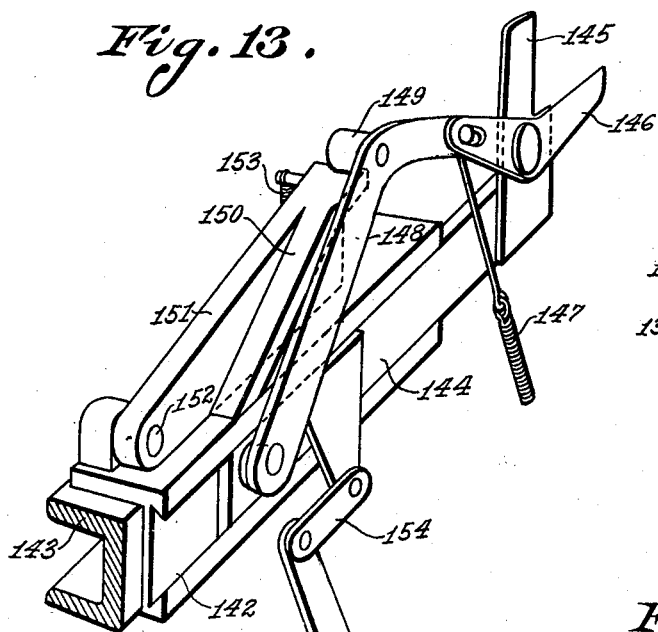
Figure 13 is a perspective view showing the band cutting mechanism.
Figure 11:
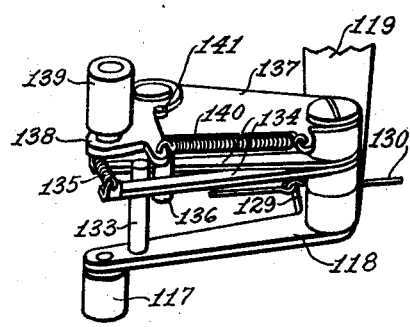
Figure 11 and Figure 12 are perspective views showing the wrapping mechanism in detail.
Figure 12:
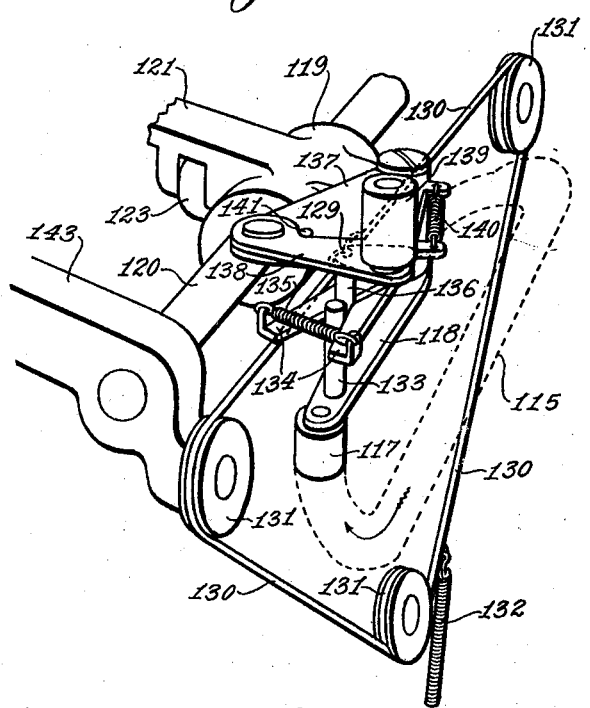

Referring now, more particularly, to Figs. 10 and 13, arranged to slide in a guideway 142 on a part 143 of the machine frame, is a slide 144 carrying at its outer end a vertical cutter blade 145 arranged to cooperate with a pivoted cutter blade 146 tensioned by a spring 147 anchored at its lower end. Mounted on the slide is an arm 148 having a cam roll 149 arranged to cooperate with a cam 150 on a block 151 pivoted at 152 on the guideway 142 and held thereagainst by a spring 153 anchored at its lower end. The slide 144 is connected by a link 154 with an arm 155 pivoted at its lower end and connected by a link 156 with a crank 157 on the shaft 33.

The operation of wrapping the band Z around the blank will now be described. The band Z is passed from the roll 108 over one of the rolls 112, as shown in Fig. 10, then over the roll 139 and with its adhesive face against the forward blank; this is done by the operator before the machine is started. After the machine has started, the former heads will travel to the right, Fig. 10, the rolls 112 will move to the left and the roll 139 will move forwardly (away from the observer). On account of the yielding mounting of the rolls 112 and 139, these will operate to wrap the band completely around the blank in the following manner: Taking first the blank, which is positioned to the rear, Fig. 10, the roll 112 will press the band against the forward end of the box and will then move there beyond, (the band between the rolls 112 and 139 being cut as hereinafter described). As the blank moves forward the band will be carried with it along the right side of the blank. During the first part of this movement the roll 139 moves forwardly along the left side of the leading blank, Fig. 10, so as to wipe down against that side that part of the band which has just been cut. The roll 139 travels forwardly at a greater speed than the blank so that it reaches a point beyond the forward end of the blank when the roll 117 reaches the forward end of the cam slot 115. During this forward movement of the roll 139, the tension on the band 130 changes direction as previously described so that when the roll 117 reaches the forward end of the cam slot it will be urged against the outer or right hand edge of the slot so that when the end of the slot is reached the roll 117 will move into the outer branch of the cam slot. During this movement the roll 139 passes in front of the leading blank, clear of the front face thereof, and as the roll 117 enters the outer branch of the slot 115 the roll 139 engages the right side of the leading blank and begins to more rearwardly therealong so as to wipe a band against this side of the blank. During the above described movement of the roll 139, the roll 112 moves rearwardly along the left side of the trailing blank so as to wipe down against that side the end of the band just cut off. This fixes the band to the trailing blank so that during its subsequent forward movement the band will be carried along therewith. Returning now to the movement of the roll 139, rearwardly along the right side of the leading blank, this movement continues to the end of the blank. As the roll passes off the end of the leading blank it is held by the movement of the roll 117 in the outer branch of the slot 116 in a position to engage the right side of the trailing blank as the latter moves forward. The roll 139 then moves rearwardly along the right side of the trailing blank throughout its length. As the roll 139 passes off to the right side of the trailing blank the roll 117 passes from the outer to the inner branch of the cam slot. This causes the roll 139 to pass between the blank with which it has just been in contact and the succeeding blank, and at the same time the succeeding roll 112 passes between the same two blanks. The movement of these two rolls thus carries the band across the rear and front ends respectively, of the two blanks to the left hand side thereof. At the completion of this movement that portion of the band between the rolls 139 and 112 is carried to a position in front of the knife 145. During this time the cutter 145 is moved forwardly with the cutter 146 below the band, and when the parts are now in the position shown in Figures 10 and 13, the cam roll 149 will drop off the cam 151, thereby cutting the band between the rolls 112 and 139. Upon return of the slide 144 the cam roll 149 passes beneath the cam 150 and in a position again thereover, due to the yield of the spring 153. In the position of the parts as shown in Fig. 10, therefore, the band will have been cut between the rolls 112 and 139, but as the forward part of the band is held by being pasted on the forward end of the approaching blank and as the roll 112 now holds the other part of the cut band against the next blank, this band will not be released, but the operation of forming it around the next blank can again be accomplished. The cut part beyond the roll 139 is now wrapped around the blank (forward one Fig. 10) as the roll 139 passes therearound, the position of the rolls 112 and 139 being so designed with reference to the cutter that the band length beyond the roll 139 is sufficient to complete the wrapping.

The band is now completely wrapped around the former but its upper and lower edges project beyond the blank. The next operation is, therefore, one of folding these edges against the bottom of the blank and wrapping the same over the top edges of the blank. As a given former moves forward to the position shown in Fig. 14, a roll 158 operates to fold in and against the bottom of the blank the end of the band. This roll 158 revolves freely on an arm 159 pivoted at 160, on a carrier 161, in turn pivoted at 162 on the machine frame and normally held in raised position by a spring 163. An arm 164 connected with the roller-carrying arm 159 is connected by a link 165 to an arm 166 on shaft 125, Fig. 1. As the former passes on, the roll 158 will be swung to the right, Fig. 14, to press the lagging edge of the wrapper against the bottom of the leading blank and upon return movement will press the wrapper of the lagging blank against the bottom thereof. The spring 163 together with the pivotal mounting of the carrier 161 provides means for securing the yielding pressure.

Figure 14:
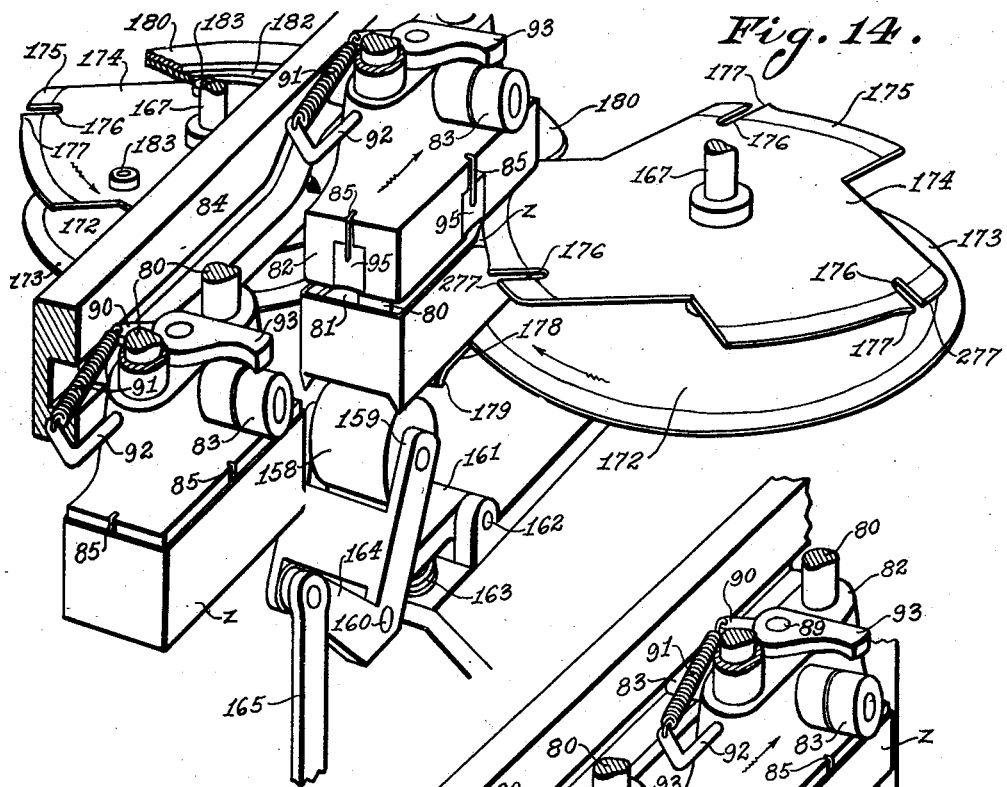
Figure 14 is a perspective view showing mechanisms for turning the extended portions of the wrapper band, which when sealed creates the facing.

Referring now to Fig. 14, in connection with Figs. 1 and 2, arranged on each side of the machine is a vertical shaft 167, having on its upper end a beveled gear 168, Fig. 1, meshing with a corresponding gear 169, on a shaft 170, which has a sprocket 171 meshing with the sprocket chain 42. Mounted on each shaft is an uninterrupted disk 172 having a beveled face 173 and an interrupted disk 174 having a beveled face 175 and slots 176 providing fingers 277 and downwardly projecting tips 177. These disks are moved in the directions of the arrows, Fig. 14. Arranged underneath the bottom disk 172, and in position to engage the bottom of the flange, is a strip 178 supported on the machine frame and having its lower end turned down as shown at 179.

As the blank moves from the left to the right position, Fig. 14, the cam groove in plate 84 operates to raise the plunger 82 so as to cause the plunger to clear the top of the blank and of the wrapper. The disks 172 and 174 can now operate to fold in the top and bottom edges of the wrapper along the sides and press them against the bottom. However, since the upwardly projecting wrapper portions at the ends of the box have not been turned over, means must be provided for accomplishing this. Accordingly, a finger 180, Figs. 2 and 14, tensioned by a spring 181, is pivoted on one of the shafts 167 and has a cam 182 engaged by rolls 183. This finger 180 is operated before the side edges of the wrapper are turned in to move the upper wrapper edge at the forward end of the blank in. Thereafter the disk 174 operates to turn in the sides of the wrapper. At the conclusion of the turning in of the sides of the wrapper the fingers 277 operate to turn in the lagging upper edge of the wrapper as follows: When a slot 176 is nearly transverse of the machine, the lagging wrapper edge will enter this slot and the side edge will be turned down where it meets the end edge by the tip 177; as now the finger 277 passes over the transverse line, it will move faster than the box (along the machine) so as to turn in the upstanding edge. Accordingly, the wrapper will be turned in not only along the bottom sides of the blank, but also along the top sides and ends.

Figure 15:
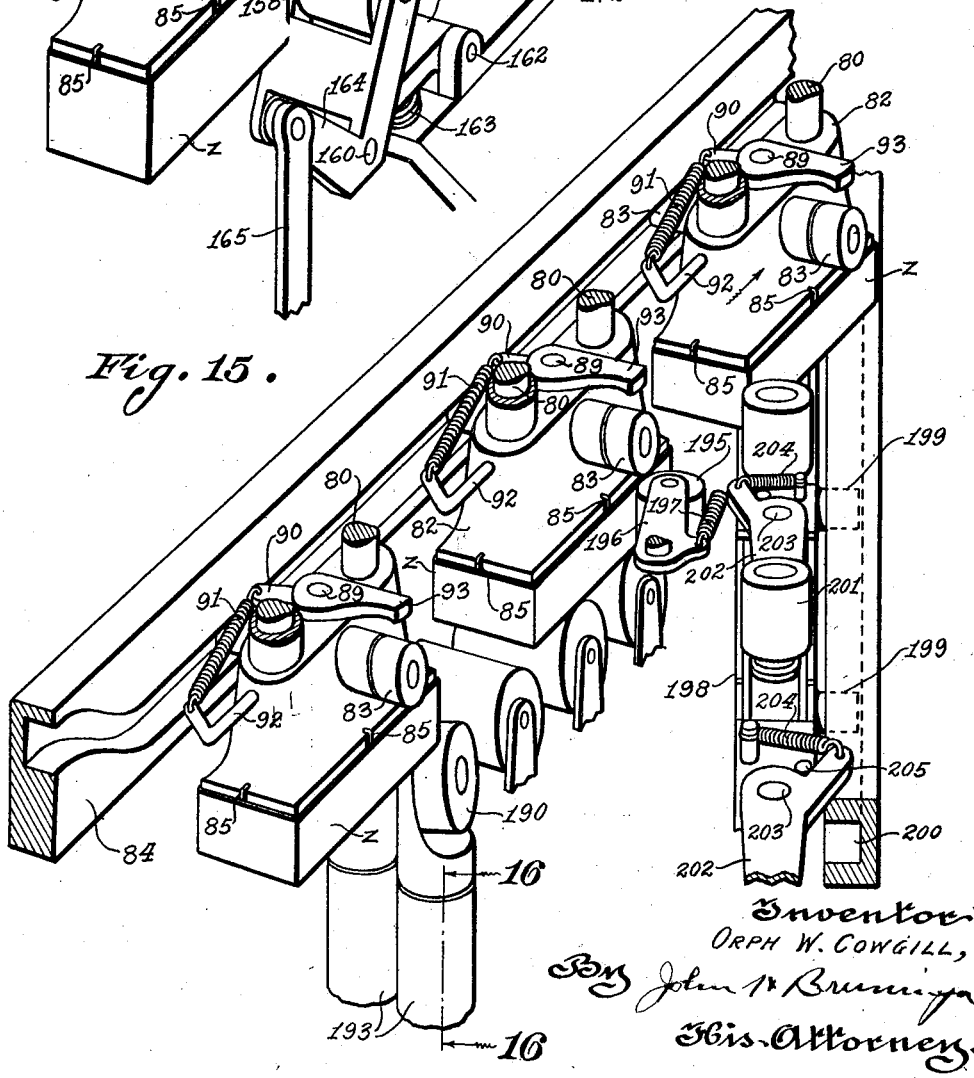
Figure 15 is a perspective view showing mechanism for firmly pressing the wrapper band against the formed blank.

After the wrapper has thus been turned in as described, the plunger 82 will again move down in the blank so as to press the inwardly turned edges of the wrapper against the inside faces of the blank. This is shown in Fig. 15. It will be noted in this connection that the groove enlargements 95 terminate vertically short of the top edge of the blank; accordingly, the wrapper will be wiped in by substantially continuous end and side faces; for the retaining fingers 85 substantially fill the grooves above the enlargements 95, and the latter move below the top of the box, since the cam groove in 84 has a drop at this point which drives the plunger down a greater distance than before.

Figure 16:
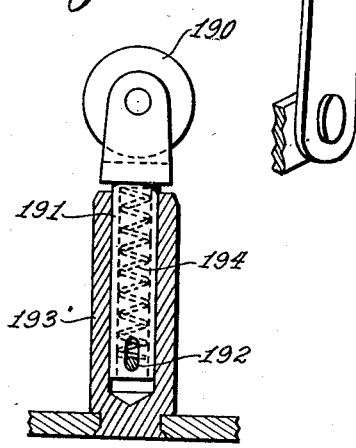
Figure 16 is a detail section through one of the pressers on the line 16—16, Fig. 15.

After the wrapper has thus been wiped in, the wrapped box is carried along over rolls 190, Fig. 15, and Fig. 16, each having a shank 191 retained against rotation (by a pin 192) in a socket 193 in which the shank can slide vertically, the spring 194 pressing this roll up and against the bottom of the box so as to firmly wipe and press the wrapper thereagainst. A side roll 195, Fig. 15, is provided on each side of the box; this roll being mounted on a pivot arm 196 tensioned by a spring 197 so as to press against the side of the box in order to wipe and press the wrapper thereagainst. Arranged to move diagonally across the frame is a sprocket chain 198, Fig. 15, guided by rolls 199 traveling in a groove 200 on the machine frame and running over sprockets, one of which is mounted on the shaft 38, Fig. 2. Mounted on this chain 198 are rolls 201, each mounted on an arm 202 pivoted at 203 and held by a spring 204 against a stop 205. These rolls are so constructed, arranged and timed to wipe the wrapper against the ends of the box as the forms move along the machine, the spacing of the rolls being such and their yielding mounting such, as to cause one roll to wipe the forward end while the lagging roll wipes the rear end.

The box will now be completed since the wrapper has been applied and firmly wiped in position. The plunger 82 is now again raised out of the box while the latter passes underneath a forked guide 206, Fig. 2, which engages the top of the box and straddles the shanks 80, thereby causing the box to be stripped off as the heads move around the forward sprocket, the box dropping on a chute 207.

Figure 17 is a flow sheet showing the successive operations performed on the blank. The strip X is cut and scored to form the blank Y (position B) which is then positioned in the mold or carrier 73 by the lugs 74 (position C). The retaining fingers 85 move away from the plunger 82 (position D) as the head and plunger move down and the mold up in order to form the blank; the retainers 85 then move in to press the upstanding sides and ends of the blank against the mold 82 (position E). The elements 112 and 139 now operate to apply and fold the band Z around the shaped blank while the cutter 146 operates to sever the band between the elements (positions F, G, F' and G'). The wiper 158 then operates to wipe the band at the ends against the bottom of the box (positions H and I). The plunger 82 now rises (position J) and the disks 172 and 174 operate to turn in the edges of the band while the finger 180 operates to turn in the end of the band at the top and the fingers on the interrupted disk 174 operates to turn in the band at the other end (positions K, L and M). The plunger 82 now again moves down while the box is supported by the rolls 190, this plunger moving down sufficiently to wipe the inwardly projecting edges of the band against the inside face of the box while the rolls 190 operate to press and smooth the edges of the band against the box bottom (position N). As the box passes on, side wiping rollers 195 operate to wipe and smooth the band along the side of the box (position O) and the wiping rolls 201 operate to smooth the box ends (positions P and Q). The plunger 82 now rises to permit the formed guide 206 to pass between the plunger and the top of the box (position R) and as the forming heads are carried over the sprocket at the end of the machine the box is stripped from the former (position S).

While the invention is particularly applicable to the type of box illustrated, it will be understood that the same is merely illustrative of one of the embodiments of this invention and not limitative; for this invention as far as method, procedure and mechanism are concerned, is applicable in many cases to other forms and styles of boxes. It will, furthermore, be understood that certain features, operations, mechanisms and sub-combinations are of utility and may be employed without reference to other features, operations mechanisms and sub-combinations; that is contemplated by and is within the scope of the appended claims. It is furthermore obvious that various changes may be made in details, operations and structures, within the scope of the appended claims without departing from the spirit of this invention. It is, therefore, to be understood that this invention is not to be limited to the specific details, operations, and structures shown and/or described.

Having thus described the invention what is claimed is:

1. In a machine of the character described, the combination with blank forming mechanism, of means moving at an accelerated speed and engaging the blank edges adapted to deliver the blank to said forming mechanism.

2. In a machine of the character described, the combination with blank cutting mechanism, of blank forming mechanism, and means engaging the blank edge adapted to move the blank at an accelerated speed from said cutting mechanism to said forming mechanism.

3. In a machine of the character described, the combination with a blank guide, of blank forming mechanism spaced from said guide, and means for projecting the blank from said guide to said forming mechanism.

4. In a machine of the character described, the combination with a blank guide, of a blank forming element movable into blank receiving position with respect to said guide, and means for projecting the blank from said guide to said element.

5. In a machine of the character described, the combination with a blank guide, of a series of blank forming elements movable successively into blank receiving positions with respect to said guide, and means for successively projecting the blanks from said guide to said elements.

6. In a machine of the character described, the combination with a blank guide, of a series of blank forming elements, means for successively moving said elements from below said guide and into blank receiving position therealong and means for successively projecting the blanks from said guide to said elements.

7. In a machine of the character described, the combination with a blank guide, of a blank forming element movable to an inclined position with respect to said guide and having a stop at its leading end, means for projecting a blank from said guide and against said stop, and means for moving said forming element away from said guide.

8. In a machine of the character described, a traveling blank former comprising, a head adapted to engage the blank, a plunger movable on said head, means for causing said head and plunger to travel along the machine, and means operating during such travel adapted to move said plunger successively to different extents.

9. In a machine of the character described, wrapping mechanism comprising, a carrier, a band applying element thereon, means for reciprocating said carrier, and means for moving said element on said carrier and so as to engage three sides of the wrapped article.

10. In a machine of the character described, wrapping mechanism comprising, a carrier, a band applying element thereon, means for reciprocating said carrier, and yielding means for moving said element on said carrier and so as to engage three sides of the wrapped article.

11. In a machine of the character described, wrapping mechanism comprising, a carrier, a band applying element yieldingly mounted thereon, means for reciprocating said carrier, and means for moving said element on said carrier and so as successively to engage three sides of the wrapped article.

12. In a machine of the character described, the combination with a box support, of a band applying element, and means for yieldingly moving said element in a circuit completely around the box in order to apply the band thereto.

13. In a machine of the character described, the combination with a traveling box support, of a band applying element, and means for yieldingly moving said element in a circuit completely around the box while traveling with said support in order to apply the band to the box.

14. In a machine of the character described, the combination with a traveling box support, of means for applying a band to the box, a rotatable disk element in the path of said support having separated peripheral sections proportioned to turn the projecting band extension inwardly of the box along its side and end edges, and means for wiping the inwardly projecting band extension against the inside face of the box.

15. In a machine of the character described, the combination with a series of traveling box supports, of a carrier movable transverse of the line of movement of said supports, and a series of elements mounted on said carrier and adapted successively to engage the forward ends of the advancing boxes.

16. In a machine of the character described, the combination with a series of traveling box supports, of a carrier movable transverse to the line of movement of said supports, and a series of wiping elements yieldingly mounted on said support, the elements being successively yielding in opposite directions.

17. In a machine of the character described, a series of traveling box supports, means for moving said supports along the machine, a carrier movable transversely of the line of movement of said supports, and a series of elements mounted on said carrier and adapted successively to engage the ends of the advancing boxes.

18. In a machine of the character described, a series of traveling box supports, means for moving said supports in a train along the machine, a carrier movable transversely of the line of movement of said train and in timed relation therewith, and a series of elements mounted on said carrier and adapted successively to engage the end of the advancing boxes.

19. In a machine of the character described, a series of traveling box supports, means for moving said supports along the machine, a carrier movable transversely of the line of movement of said supports, a series of elements mounted on said carrier, and means for moving said carrier so as to move said elements successively thru said train and so as to engage the ends of the advancing boxes.

In witness whereof I affix my signature this 18th day of July, 1927.

ORPH W. COWGILL.